United States Patent
Jones et al.

(10) Patent No.: US 10,546,271 B2
(45) Date of Patent: Jan. 28, 2020

(54) SYSTEMS AND METHODS FOR ESTIMATING AVAILABILITY OF ADDITIONAL SALES FLOOR SPACE FOR A PRODUCT BEING BINNED

(71) Applicant: Walmart Apollo, LLC, Bentonville, AR (US)

(72) Inventors: Nicholaus A. Jones, Fayetteville, AR (US); Aaron J. Vasgaard, Rogers, AR (US); Robert J. Taylor, Rogers, AR (US); Matthew A. Jones, Bentonville, AR (US)

(73) Assignee: Walmart Apollo, LLC, Bentonville, AR (US)

( * ) Notice: Subject to any disclaimer, the term of this patent is extended or adjusted under 35 U.S.C. 154(b) by 336 days.

(21) Appl. No.: 15/592,456

(22) Filed: May 11, 2017

(65) Prior Publication Data

US 2017/0330139 A1 Nov. 16, 2017

Related U.S. Application Data (60) Provisional application No. 62/335,380, filed on May 12, 2016.

(51) Int. Cl.
*G06Q 10/08* (2012.01)
(52) U.S. Cl.
CPC .................. *G06Q 10/087* (2013.01)
(58) Field of Classification Search
CPC .................................................. G06Q 10/087
See application file for complete search history.

(56) References Cited

U.S. PATENT DOCUMENTS

| 6,598,025 B1 | 7/2003 | Hamilton |
|---|---|---|
| 7,991,651 B2 | 8/2011 | Hanks |
| 8,502,869 B1 | 8/2013 | Fuhr |

(Continued)

FOREIGN PATENT DOCUMENTS

WO 2016019084 2/2016

OTHER PUBLICATIONS

PCT; App. No. PCT/US2017/31706; International Search Report and Written Opinion dated Aug. 11, 2017.

*Primary Examiner* — Florian M Zeender
*Assistant Examiner* — Joseph M Mutschler
(74) *Attorney, Agent, or Firm* — Fitch, Even, Tabin and Flannery, LLP (57) ABSTRACT

In some embodiments, methods and systems of estimating whether additional space for a product being binned is available on a sales floor include an electronic inventory management device configured to: receive an indication that a product is being placed into a storage bin after a determination that no space for the product is available in a primary display location of the product on the sales floor; obtain a demand for the product on the sales floor during a predetermined interval of time; retrieve at least one inventory position estimation factor associated with the product when the demand for the product during the predetermined interval of time is greater than zero; estimate whether the inventory position estimation factor supports a likelihood that the product is in a feature display location on the sales floor; and output an indication of possible space availability for the product on the feature display location.

10 Claims, 3 Drawing Sheets

(56) References Cited

U.S. PATENT DOCUMENTS

| | | |
|---|---|---|
| 8,738,461 B1 | 5/2014 | Chu |
| 2006/0054692 A1* | 3/2006 | Dickey ................... C08F 10/00 235/385 |
| 2009/0198552 A1 | 8/2009 | Selinger |
| 2013/0339083 A1 | 12/2013 | Baier |
| 2014/0100769 A1* | 4/2014 | Wurman .............. G06Q 10/087 701/301 |
| 2014/0258050 A1 | 9/2014 | Abboud |
| 2015/0112762 A1 | 4/2015 | Lahmar |
| 2015/0178671 A1 | 6/2015 | Jones |
| 2016/0048798 A1* | 2/2016 | Meyer ................. G06Q 10/087 705/28 |

\* cited by examiner

SYSTEMS AND METHODS FOR ESTIMATING AVAILABILITY OF ADDITIONAL SALES FLOOR SPACE FOR A PRODUCT BEING BINNED

CROSS-REFERENCE TO RELATED APPLICATION

This application claims the benefit of U.S. Provisional Application No. 62/335,380, filed May 12, 2016, which is incorporated herein by reference in its entirety.

TECHNICAL FIELD

This disclosure relates generally to managing inventory at retail sales facilities and, in particular, to systems and methods for determining availability of additional sales floor space for a product being binned.

BACKGROUND

Retail sales facilities (e.g., large department stores) typically display products on their primary display locations (e.g., shelves) on the sales floor, but often offer products for sale to consumers on feature display locations designed to attract consumers' attention to the products. Retail sales facilities may set their inventory management systems to update the inventory management databases to indicate that a product may be displayed on the sales floor both in a primary display location and a feature display location.

When a product is sold at the point of sale device (e.g., sale register) on the sales floor, the scanning of the product at the point of sale device does not indicate whether the product being purchased by the consumer came from the primary display location or from the feature display location. A problem that occurs as a result of products being sold from feature display locations on the sales floor is that a worker at the retail sales facility bringing a replenishment product to the sales floor typically does not know that this product is sold both in the primary display location and the feature display location.

When the worker arrives at the primary display location of the product with one or more replenishment products only to see that the primary display location of the product on the sales floor does not have available space for the replenishment products, the worker may assume that the replenishment request for the product was erroneous and would return the replenishment products to the stock room to be re-binned. As a result, the replenishment products brought out onto the sales floor to replace the products known to be sold to consumers do not end up on the sales floor, but end up back in a storage bin in the stock room, while empty spaces allotted for these products continue to exist on the sale floor, undesirably leading to possible lost sales for the retail sales facility.

BRIEF DESCRIPTION OF THE DRAWINGS

Disclosed herein are embodiments of systems, devices, and methods pertaining to methods and systems for estimating whether additional space for a product being binned is available on a sales floor of a retail sales facility. This description includes drawings, wherein.

Elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments. Certain actions and/or steps may be described or depicted in a particular order of occurrence while those skilled in the art will understand that such specificity with respect to sequence is not actually required. The terms and expressions used herein have the ordinary technical meaning as is accorded to such terms and expressions by persons skilled in the technical field as set forth above except where different specific meanings have otherwise been set forth herein.

DETAILED DESCRIPTION

The following description is not to be taken in a limiting sense, but is made merely for the purpose of describing the general principles of exemplary embodiments. Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Generally, the systems, devices, and methods described herein provide for estimating whether additional space for a product being binned is available on a sales floor of a retail sales facility. In some embodiments, an electronic inventory management device receives an indication that a product is being placed into a storage bin in a stock room after a determination that no space for the product is available in a primary display location of the product on the sales floor and obtains a demand for the product on the sales floor during a predetermined interval of time. The electronic inventory management device then retrieve at least one inventory position estimation factor associated with the product when the demand for the product during the predetermined interval of time is determined to be greater than zero, estimates whether the inventory position estimation factor supports a likelihood that the product is in a feature display location on the sales floor, and outputs an indication of possible space availability for the product on the feature display location.

In one embodiment, a system of estimating whether additional space for a product being binned is available on a sales floor of a retail sales facility includes an electronic inventory management device including a processor-based control unit. The control unit is configured to: receive electronic data indicating that at least one product is being placed into a storage bin in a stock room of the retail sales facility after a determination that no space for the at least one product is available in a primary display location of the at least one product on a sales floor of the retail sales facility; obtain electronic data representing a demand for the at least one product on the sales floor of the retail sales facility during a predetermined interval of time; retrieve electronic data representing at least one inventory position estimation factor associated with the at least one product when the demand for the at least one product during the predetermined interval of time is greater than zero; estimate whether the at least one inventory position estimation factor supports a likelihood that the at least one product is stocked in a feature display location on the sales floor of the retail sales facility; and output, when the at least one inventory position estimation factor supports a likelihood that the at least one product is stocked in the feature display location, electronic data indicating possible space availability for the at least one product on the feature display location on the sales floor. The system further includes an electronic scanning device configured to scan the at least one product; an electronic inventory management database configured to store data representing the demand for the at least one product on the sales floor of the retail sales facility and data representing the at least one inventory position estimation factor associated with the at least one product. The control unit is further configured to: receive electronic data from the electronic scanning device in response to the worker at the retail sales facility scanning the at least one product using the electronic scanning device when the worker is placing the at least one product into the storage bin; and retrieve the electronic data representing the at least one inventory position estimation factor associated with the at least one product from the electronic inventory management database.

In another embodiment, a method of estimating whether additional space for a product being binned is available on a sales floor of a retail sales facility includes: receiving, from an electronic scanning device in response to a worker at the retail sales facility the at least one product using the electronic scanning device when the worker is placing the at least one product into the storage bin, at an electronic inventory management device including a processor-based control unit, electronic data indicating that at least one product is being placed into a storage bin in a stock room of the retail sales facility after a determination that no space for the at least one product is available in a primary display location of the at least one product on a sales floor of the retail sales facility; providing an electronic inventory management database configured to store data representing a demand for the at least one product on the sales floor of the retail sales facility and data representing at least one inventory position estimation factor associated with the at least one product; obtaining, at the electronic inventory management device and from the electronic inventory management database, electronic data representing the demand for the at least one product on the sales floor of the retail sales facility during a predetermined interval of time; retrieving, using the electronic inventory management device and from he electronic inventory management database, electronic data representing the at least one inventory position estimation factor associated with the at least one product when the demand for the at least one product during the predetermined interval of time is greater than zero; estimating, via the processor-based control unit, whether the at least one inventory position estimation factor supports a likelihood that the at least one product is stocked in a feature display location on the sales floor of the retail sales facility; and outputting, when the at least one inventory position estimation factor supports a likelihood that the at least one product is stocked in the feature display location, electronic data indicating possible space availability for the at least one product on the feature display location on the sales floor.

Figure 1:
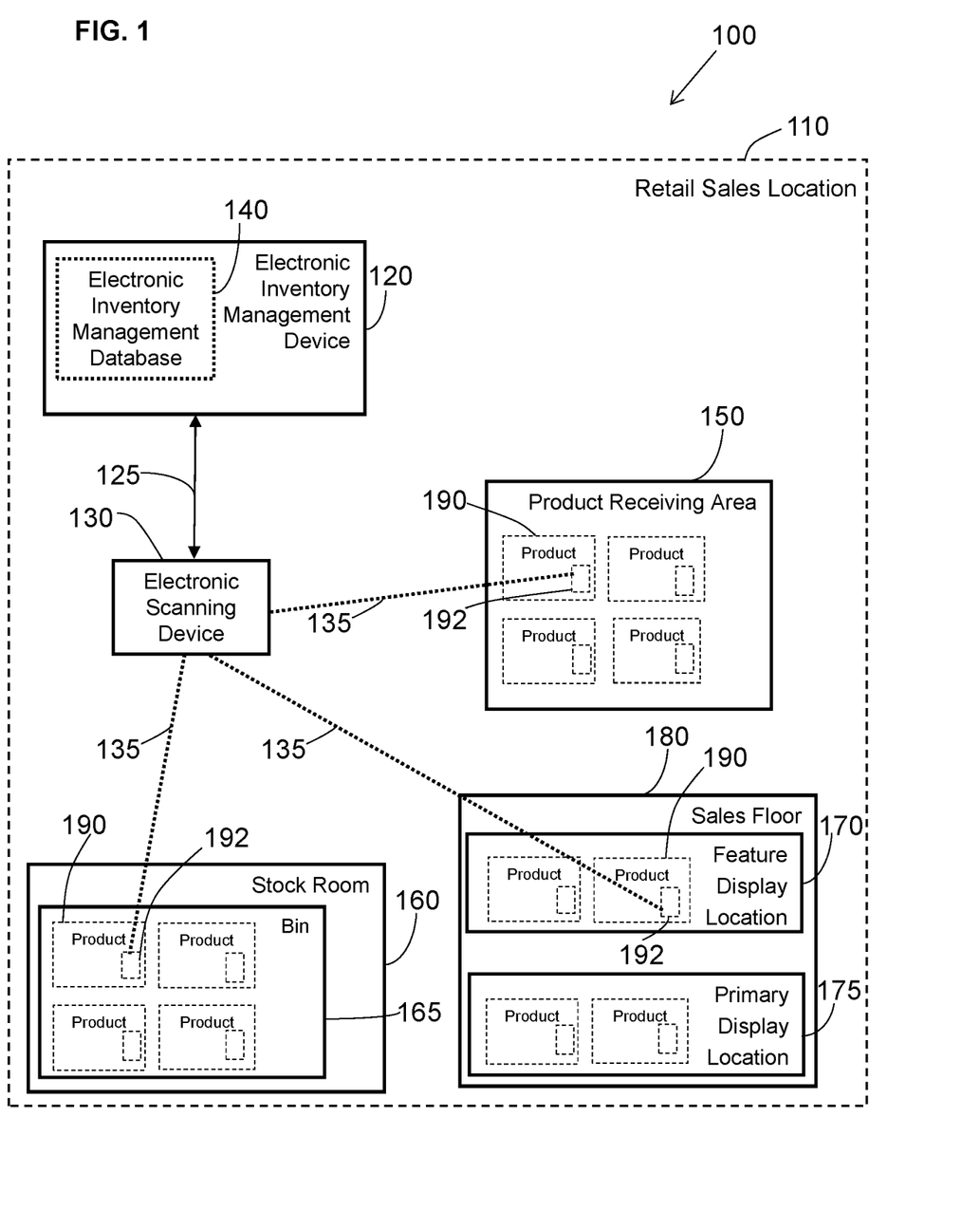
FIG. 1 is a diagram of a system for estimating if additional space for a product being binned is available on a sales floor of a retail sales facility in accordance with some embodiments.

The exemplary system 100 in FIG. 1 includes an electronic inventory management device 120 configured generally to manage the inventory of products 190 at the retail sales facility 110. More specifically, the electronic inventory management device 120 is configured to manage and/or store electronic data associated with the products 190 at the retail sales facility 110, as well as tasks performed by a worker or workers with respect to the products 190 at the retail sales facility 110. The electronic inventory management device 120 in FIG. 1 may be a stationary or portable electronic device, for example, a desktop computer, a laptop computer, a tablet, a mobile phone, or any other electronic device including a processor-based control unit (i.e., control circuit) and configured for data entry and one-way and/or two-way communication (e.g., via communication channel 125) with another device located at the retail sales facility 110 (e.g., scanning device 130), or with another device at a location remote to the retail sales facility 110 (e.g., a regional server configured for two-way communication with the electronic inventory management device 120 at the retail sales facility 110).

With reference to FIG. 1, the exemplary electronic inventory management device 120 includes an electronic inventory management database 140 configured to store electronic information associated with the products 190 at the retail sales facility 110 and associated with the worker tasks performed or scheduled to be performed by the workers with respect to the products 190. The electronic inventory management database 140 may be stored, for example, on non-volatile storage media (e.g., a hard drive, flash drive, or removable optical disk) internal or external relative to the electronic inventory management device 120, or internal or external to computing devices separate from the electronic inventory management device 120. In some embodiments, the electronic inventory management database 140 may store electronic data including but not limited to electronic data representing inventory position estimation factors associated with the products 190 at the retail sales facility 110. Regardless of whether the electronic inventory management database 140 is internal to or external to the electronic inventory management device 120, the control unit of the electronic inventory management device 120 is configured to retrieve the electronic data representing the inventory position estimation factors associated with the products 190 from the electronic inventory management database 140.

Exemplary inventory position estimation factors storable in and retrievable from the electronic inventory management database 140 include, but are not limited to: electronic data indicating that a product 190 being placed into a storage bin 165 in a stock room 160 of the retail sales facility 110 was delivered to the retail sales facility 110 and not previously placed into a storage bin 165 in the stock room 160 since being delivered as part of an above-average size delivery to the retail sales facility 110; electronic data indicating that the product 190 being placed into the storage bin 165 in the stock room 160 was previously picked from a storage bin 165 in the stock room 160 to be stocked in the primary display location 175 on the sales floor 180; electronic data indicating that present on-hand inventory of the product 190 is above average on-hand inventory; electronic data indicating that sales of the one product 190 during a predetermined interval of time are above average sales of the product 190 during an identical interval of time; electronic data indicating that a most recent delivery of the product 190 included a number of units of the product 190 that is greater than an average number of units of the products 190 delivered to the retail sales facility 110; and electronic data indicating that a manual replenishment order for the product 190 was made at the retail sales facility 110.

As described in more detail below, in some embodiments, the inventory position estimation factors stored in the electronic inventory management database 140 permit the electronic inventory management device 120 to estimate whether additional space for a replenishment product 190 being re-binned by a worker into a storage bin 165 is available on the sales floor 180 of a retail sales facility 110. This estimation by the electronic inventory management device 120 may advantageously lead to an indication to the worker that, despite the worker's determination that no space is available for the product 190 at the primary display location 175 on the sales floor 180 of the retail sales facility 110, space for the product 190 being re-binned by the worker is possibly available at the feature display location 170 on the sales floor 180 of the retail sales facility 110. This indication then prompts the worker to bring the replenishment product 190 being re-binned back onto the sales floor 180 to be stocked at the feature display location 170 from which the product 190 being replenished was sold to a consumer.

The above-described exemplary electronic data and other electronic data associated with the products 190 and worker tasks at the retail sales facility 110 may be recorded in the electronic inventory management database 140, for example, as a result of a task performed by a worker at a retail sales facility 110 with respect to the products 190. For example, the worker may enter a worker task into the electronic scanning device 130 indicating that the products 190 have been received at the retail sales facility 110 in a product receiving area 150 and are being unloaded from a delivery truck. Also, the worker may scan a product 190 using the electronic scanning device 130 when binning the product 190 into a bin 165 in the stock room 160, when picking the product 190 from the storage bin 165 in the stock room 160, when setting the product 190 onto a primary display location 175 on the sales floor 180 and/or when setting the product 190 onto a feature display location 170 on the sales floor 180. In some embodiments, at least some of the electronic data stored in the electronic inventory management database 140 may be transmitted to the electronic inventory management device 120 from a remote server, for example, a regional server associated with the retail sales facility 110.

In the embodiment shown in FIG. 1, the system 100 includes an electronic scanning device 130 in two-way communication with the electronic inventory management device 120 over a communication channel 125 (which may be a wired or wireless channel). The electronic scanning device 130 may be an electronic (e.g., hand-held) scanner that may be used by a worker at the retail sales facility 110. In some embodiments, the electronic scanning device 130 is configured to scan one or more products 190 at the retail sales facility 110, and more specifically, to scan one or more product identifying indicia 192 present on the products 190 or on the packaging of the products 190. In some embodiments, the electronic inventory management device 120 is configured to receive electronic data from the electronic scanning device in response to a worker at the retail sales facility 110 scanning one or more products 190 using the electronic scanning device 130 when the worker is placing one or more products 190 into a storage bin 165.

Examples of such electronic scanning devices 130 may include, but are not limited to barcode (e.g., UPC, EAN, GTIN12, GTIN 13, or the like) readers, quick response (QR) code readers, radio frequency identification (RFID) readers, stock keeping unit (SKU) readers, near field communication (NFC) readers, video capture-enabled devices (e.g., cameras, smartwatches, glasses, or the like) electronic tablets, cellular phones, or the like mobile electronic devices. Alternatively, the electronic scanning device 130 may be a stationary electronic scanning device installed in the product receiving area 150, stock room 160, or on the sales floor 180 of the retail sales facility 110. In the embodiment illustrated in FIG. 1, the electronic scanning device 130 may obtain electronic data associated with the scanned product 190 by communicating via a communication channel 135 (e.g., radio waves) with a unique identifying indicia 192 (e.g., barcode, RFID, SKU, or the like) on an exterior of the product 190 or on an exterior of the packaging of the product 190.

Figure 2:
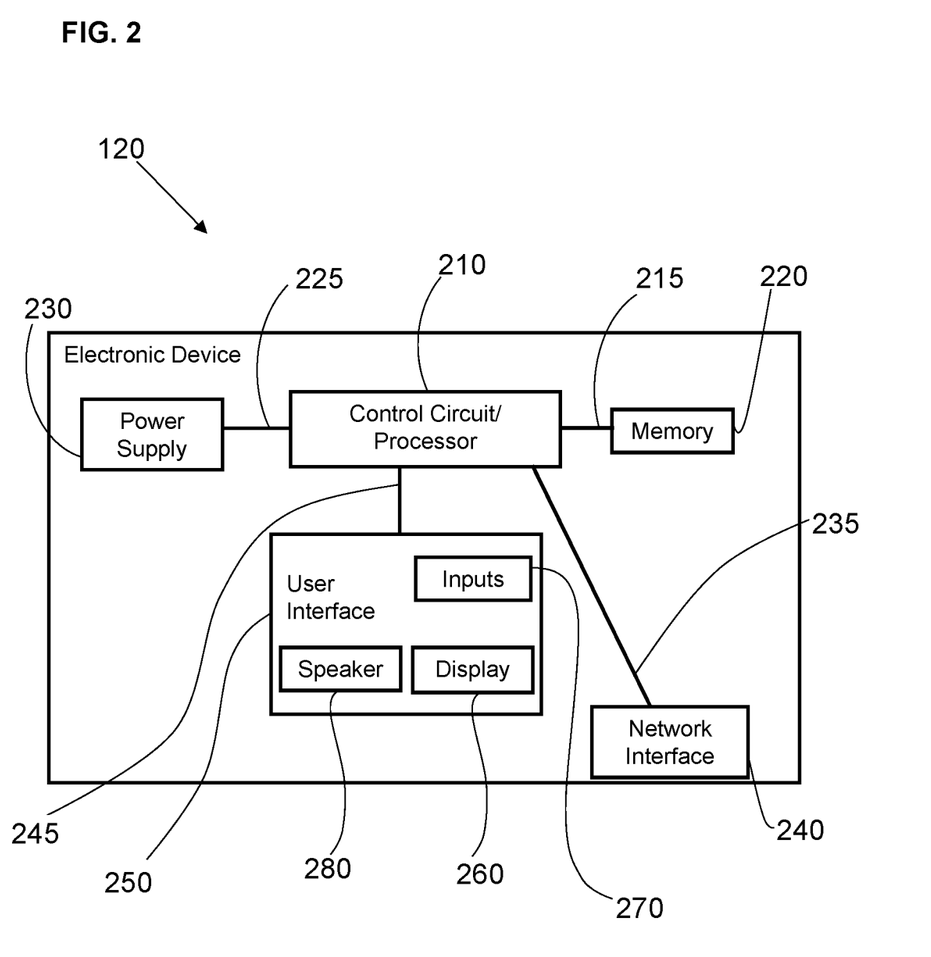
FIG. 2 is a functional block diagram of an electronic inventory management device in accordance with some embodiments.

An exemplary electronic inventory management device 120 depicted in FIG. 2 is a computer-based device and includes a control circuit (i.e., control unit) 210 including a processor (for example, a microprocessor or a microcontroller) electrically coupled via a connection 215 to a memory 220 and via a connection 225 to a power supply 230. The control unit 210 can comprise a fixed-purpose hard-wired platform or can comprise a partially or wholly programmable platform, an application specification integrated circuit, a field programmable gate array, and so on. These architectural options are well known and understood in the art and require no further description.

This control unit 210 can be configured (for example, by using corresponding programming stored in the memory 220 as will be well understood by those skilled in the art) to carry out one or more of the steps, actions, and/or functions described herein. In some embodiments, the memory 220 may be integral to the processor-based control unit 210 or can be physically discrete (in whole or in part) from the control circuit (i.e., control unit) 210 and is configured non-transitorily store the computer instructions that, when executed by the control unit 210, cause the control unit 210 to behave as described herein. (As used herein, this reference to "non-transitorily" will be understood to refer to a non-ephemeral state for the stored contents (and hence excludes when the stored contents merely constitute signals or waves) rather than volatility of the storage media itself and hence includes both non-volatile memory (such as read-only memory (ROM)) as well as volatile memory (such as an erasable programmable read-only memory (EPROM))). Accordingly, the memory 220 and/or the control unit 210 may be referred to as a non-transitory medium or non-transitory computer readable medium.

In the embodiment illustrated in FIG. 2, the control unit 210 is also electrically coupled via a connection 235 to a network interface 240 that can receive signals from and transmit signals such as commands, inventory database information, and other electronic data via a wireless or wired connection to electronic devices local to the retail sales facility 110, or one or more servers remote to the retail sales facility 110. The network may be a wide-area network (WAN), a local area network (LAN), a personal area network (PAN) or any other sized network. The network may enable one or more electronic devices to communicate via the Internet and may include cloud-based features, such as cloud-based memory storage. The communications over the network may take place over hard-wired, cellular, Wi-Fi or Bluetooth networked components or the like.

Optionally, instead of receiving information associated with the products 190 located in the product receiving area 150, and/or stock room 160, and/or sales floor 180 of the retail sales facility 110 from a separate scanner such as the electronic scanning device 130, the control unit 210 of the electronic inventory management device 120 may be electrically coupled to a sensor such as a reader configured to detect and/or read information on the identifying indicia 192 of a product 190 when the electronic inventory management device 120 is placed in direct proximity to the product 190 to enable the scanning of the identifying indicia 192 of the product 190. Such an optional reader may include, but is not limited to an RFID reader, optical reader, barcode reader, or the like.

In the embodiment shown in FIG. 2, the processor-based control unit 210 of the electronic inventory management device 120 is electrically coupled via a connection 245 to a user interface 250, which may include a visual display or display screen 260 (e.g., LED screen) and/or inputs 270 (e.g., button input) that provide the user interface 250 with the ability to permit a user such as a product unloading worker, and/or stock room associate, and/or sales floor associate at the retail sales facility 110 to manually control the electronic inventory management device 120 by inputting commands, for example, via touch-screen and/or button operation or voice. The display screen 260 of the electronic inventory management device 120 can also permit the user to see menus, options, worker tasks, and/or alerts displayed by the electronic inventory management device 120. The user interface 250 of the electronic inventory management device 120 may also include a speaker 280 that provides audible feedback (e.g., alerts) to the user.

The control unit 210 of the electronic inventory management device 120 may be programmed to perform various functions associated with estimating, based on an analysis of one or more inventory position estimation factors described above, whether additional space for a product 190 being re-binned into a storage bin 165 in a stock room 160 is available on a sales floor 180 of a retail sales facility 110. As discussed in more detail below, in some embodiments, the electronic inventory management device 120 is configured to receive electronic data indicating that one or more products 190 are being placed back into a storage bin 165 in a stock room 160 of the retail sales facility 110 after being picked from the storage bin 165 and being brought onto the sales floor 180 to the primary display location 175 of the product 190 and after a determination by the worker that no space for such products 190 is available in the primary display location 175 (e.g., modular shelf) of the products 190 on the sales floor 180 of the retail sales facility 110.

In some embodiments, control unit 210 of the electronic inventory management device 120 is programmed to obtain electronic data representing a demand for one or more products 190 on the sales floor 180 of the retail sales facility 110 during a predetermined interval of time. Such electronic data may be obtained by the electronic inventory management device 120 from the electronic inventory management database 140. In some embodiments, the control unit 210 of the electronic inventory management device 120 is configured to retrieve electronic data representing one or more inventory position estimation factors associated with one or more of the products 190 at the retail sales facility 110 when the demand for such products 190 during the predetermined interval of time is greater than zero (i.e., one or more products 190 are purchased by consumers on the sales floor 180). The control unit 210 of the electronic inventory management device 120 may be programmed in some embodiments not to retrieve electronic data representing one or more inventory position estimation factors associated with one or more of the products 190 at the retail sales facility 110 when the demand for such products 190 during the predetermined interval of time is zero (i.e., no products 190 are purchased by consumers on the sales floor 180).

In some embodiments, as will be described in more detail below, the control unit 210 of the electronic inventory management device 120 is configured to estimate whether one or more of the inventory position estimation factors analyzed by the control unit 210 supports a likelihood that one or more products 190 being binned into a storage bin 165 in the stock room 160 of the retail sales facility 110 is stocked in a feature display location 170 on the sales floor 180 of the retail sales facility 110. In addition, in some embodiments, when one or more inventory position estimation factor analyzed by the control unit 210 supports a likelihood that one or more products 190 being binned are stocked in the feature display location 170, the control unit 210 of the electronic inventory management device 120 is configured to output electronic data indicating possible space availability on the sales floor 180 for such products 190.

For example, in some embodiments, the control unit 210 of the electronic inventory management device 120 is programmed, when one or more inventory position estimation factors support the likelihood that one or more products 190 are stocked in a feature display location 170 on the sales floor 180 of the retail sales facility 110, to transmit electronic data indicating possible space availability for such one or more products 190 in the feature display location 170 to the electronic scanning device 130 of the worker at the retail sales facility 110. In some aspects, the control unit 210 of the electronic inventory management device 120 is programmed to receive (e.g., via the communication channel 125) electronic data from the electronic scanning device 130 of the worker indicating that one or more products 190 are being placed onto the feature display location 170 on the sales floor 180 of the retail sales facility 110 and, responsive to receipt of such electronic data, to transmit the generated electronic data indicating that such one or more products 190 are being placed onto the feature display location 170 on the sales floor 180 to the electronic inventory management database 140 for storage.

In some embodiments, the control unit 210 of the electronic inventory management device 120 is programmed, when one or more inventory position estimation factors support a likelihood that one or more products are stocked in the feature display location 170 on the sales floor 180 of the retail sales facility 110, to generate electronic data indicating that such one or more products 190 are stocked in the feature display location 170 on the sales floor 180, and to transmit the generated electronic data indicating that such one or more products are stocked in the feature display location 170 on the sales floor 180 to the electronic inventory management database 140.

In some aspects, the control unit 210 of the electronic inventory management device 120 is programmed, when one or more inventory position estimation factors do not support a likelihood that one or more products 190 are stocked in the feature display location 170 on the sales floor 180 of the retail sales facility 110, to output an indication to the electronic scanning device 130 of the worker to place such one or more products 190 into one or more storage bins 165 in the stock room 160 of the retail sales facility 110. For example, in some embodiments, when one or more inventory position estimation factors do not support a likelihood that one or more products 190 are stocked in the feature display location 170 on the sales floor 180, the control unit 210 of the electronic inventory management device 120 is programmed output an audible or visual alarm indicating that the primary display location 175 of one or more products 190 on the sales floor 180 has been erroneously identified as having available space for the products 190.

Figure 3:
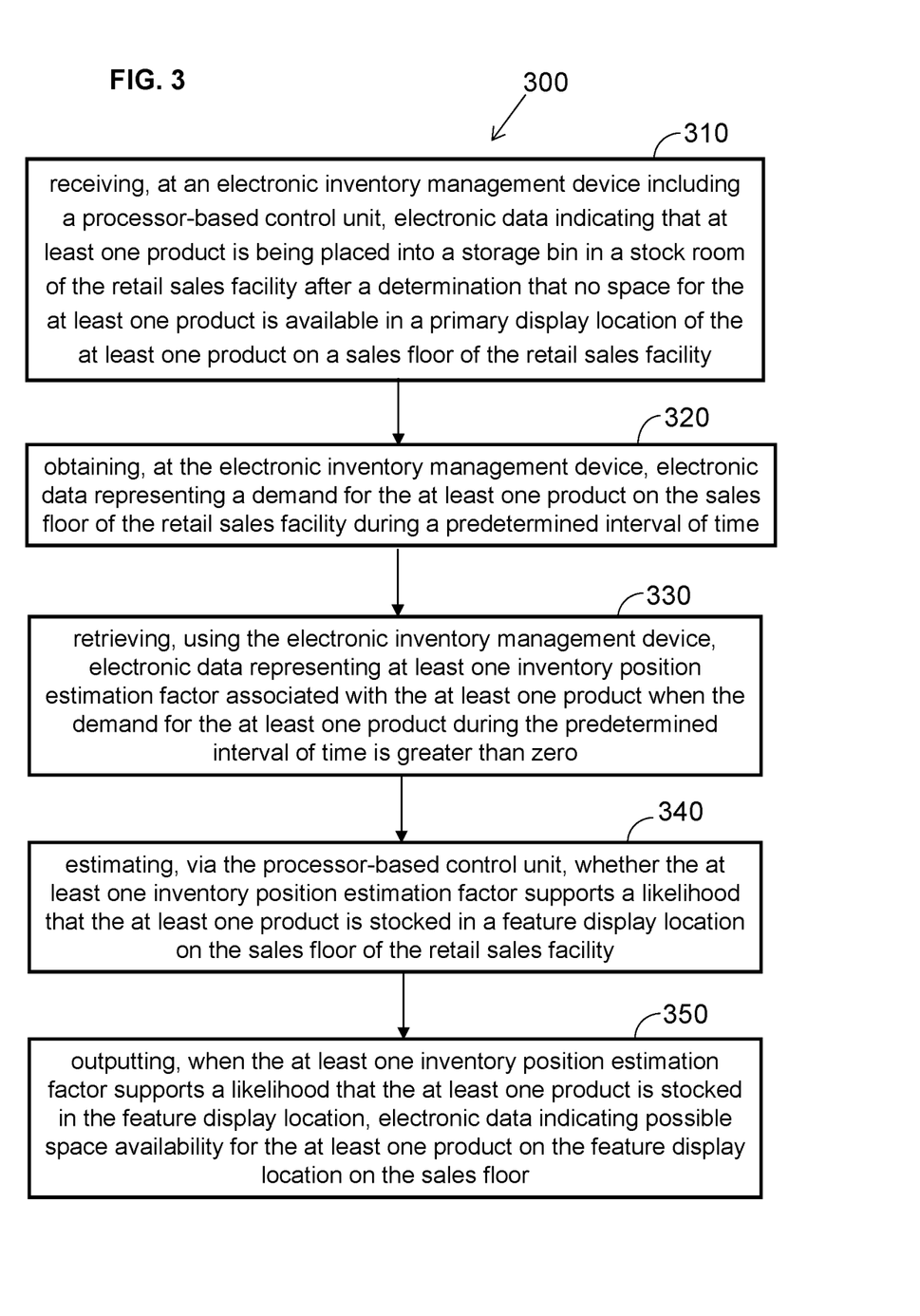
FIG. 3 is a flow diagram of a process of estimating if additional space for a product being binned is available on the sales floor in accordance with some embodiments.

With reference to FIGS. 1-3, one method 300 of operation of the system 100 for estimating whether additional space for a product 190 being binned into a storage bin 165 in the stock room 160 of a retail sales facility 110 is available on the sales floor 180 of the retail sales facility 110 will now be described. The method 300 is described in the context of the system of FIG. 1 by way of example only. It will be appreciated that embodiments of the method 300 may be implemented not only in the system 100, but in other systems.

The exemplary method 300 shown in FIG. 3 includes receiving, at an electronic inventory management device 120 including a processor-based control unit, electronic data indicating that a 190 is being placed into a storage bin 165 in a stock room 160 of the retail sales facility 110 after a determination that no space for the product 190 is available in a primary display location 175 of the product 190 on a sales floor 180 of the retail sales facility 110 (step 310). For example, a worker at the retail sales facility 110 who picked the product 190 from the storage bin 165 to replenish the product 190 that was sold to a consumer on the sales floor 180 may be placing the product 190 back into the storage bin 165 (re-binning) after having brought that product 190 to the primary display location 175 of the product 190 only to determine (e.g., visually) that no storage space is available for the product 190 in the primary display location 175, and after having returned to the stock room 160 with this product 190 to re-bin the product 190.

In some embodiments, when attempting to place the product 190 back into the storage bin 165 after the determination by the worker that no storage space is available for the product 190 in the primary display location 175, the worker scans the identifying indicia 192 on the product 190 using the electronic scanning device 130 for the purpose of associating the scanned product 190 with the condition of being stored in the storage bin 165. The identifying indicia 192 of the product 190 may be a passive identifier such as a quick response (QR) code, bar code (e.g., UPC, GTIN12, EAN, GTIN13, or the like), passive RFID tag, or the like, or may be an active identifier such as an NFC tag, active RFID tag, or the like. Such scanning of the identifying indicia 192 of the product by the electronic scanning device 130 during the re-bin attempt by the worker results in the electronic scanning device 130 transmitting electronic data representing the scanned identifying indicia 192 of the product 190 via the communication channel 125 to the electronic inventory management device 120 for storage in the electronic inventory management database 140.

In the exemplary method 300 of FIG. 3, upon the electronic inventory management device 120 receiving a transmission from the electronic scanning device 130 indicating that a particular product 190 is about to be re-binned in the storage bin 165 after an unsuccessful attempt to stock the product in the primary display location 175 on the sales floor 180 of the retail sales facility 110, the control circuit 210 of the electronic inventory management device 120 obtains electronic data representing a demand for the product 190 on the sales floor 180 of the retail sales facility 110 during a predetermined interval of time (step 320). The control circuit 210 of the electronic inventory management device 120 may obtain the electronic data representing a demand for the product 190 on the sales floor 180 of the retail sales facility 110 from the electronic inventory management database 140. The predetermined interval of time may be, for example, 1 hour, 2 hours, 3 hours, 4 hours, 5-8 hours, 8-12 hours, 12-24 hours, or more than 24 hours.

In the exemplary method 300 of FIG. 3, when the demand for the product 190 on the sales floor 180 of the retail sales facility 110 during the predetermined interval of time is greater than zero (i.e., if one or more units of the product 190 are purchased by one or more consumers on the sales floor 180), the control circuit 210 of the electronic inventory management device 120 retrieves electronic data representing one or more inventory position estimation factors associated with the product 190 (step 330). Since the electronic inventory management database 140 stores electronic data associated with each of the products 190 at the retail sales facility 110, the control unit 210 is programmed to retrieve such electronic data representing the one or more inventory position estimation factors associated with the product 190 from the electronic inventory management database 140. In some embodiments, the control unit 210 of the electronic inventory management device 120 is programmed not to retrieve electronic data representing one or more inventory position estimation factors associated with the product 190 at the retail sales facility 110 when the demand for the product 190 during the predetermined interval of time is zero (i.e., no units of the product 190 are purchased by consumers on the sales floor 180).

As discussed above, exemplary inventory position estimation factors include but are not limited to: electronic data indicating that a product 190 being placed into a storage bin 165 in a stock room 160 of the retail sales facility 110 was delivered to the retail sales facility 110 and not previously placed into a storage bin 165 in the stock room 160 since being delivered to the retail sales facility 110; electronic data indicating that the product 190 being placed into the storage bin 165 in the stock room 160 was previously picked from a storage bin 165 in the stock room 160 to be stocked in the primary display location 175 on the sales floor 180; electronic data indicating that present on-hand inventory of the product 190 is above average on-hand inventory; electronic data indicating that sales of the one product 190 during a predetermined interval of time are above average sales of the product 190 during an identical interval of time; electronic data indicating that a most recent delivery of the product 190 included a number of units of the product 190 that is greater than an average number of units of the product 190 delivered to the retail sales facility 110; and electronic data indicating that a manual replenishment order for the product 190 was made at the retail sales facility 110. As described in more detail below, based at least on such electronic data representing the one or more inventory position estimation factors associated with the product 190, the control unit 210 of the electronic inventory management device 120 is programmed to determine whether additional space for the product 190 being re-binned into a storage bin 165 in the stock room 160 is available on the sales floor 180 of the retail sales facility 110.

In the embodiment of FIG. 3, the control unit 210 of the electronic inventory management device 120 is programmed to estimate, based on analyzing the one or more inventory position estimation factors retrieved in step 330, whether such one or more inventory position estimation factors support a likelihood that the product 190 being re-binned by the worker is stocked in a feature display location 170 on the sales floor 180 of the retail sales facility 110 (step 340). In some aspects, after retrieving the electronic data representing at least one inventory position estimation factor associated with the product 190 in step 330, the control unit 210 of the electronic inventory management device 120 is programmed to interpret electronic data indicating that the product 190 being placed into the storage bin 165 was not previously placed into a storage bin 165 in the stock room 160 since being delivered as part of an above-average size delivery to the retail sales facility 110 as an indication of an increased likelihood that the product 190 is on feature at a feature display location 170 on the sales floor 180. In some aspects, after retrieving the electronic data representing at least one inventory position estimation factor associated with the product 190 in step 330, the control unit 210 of the electronic inventory management device 120 is programmed to interpret electronic data indicating that the product 190 being placed into the storage bin 165 was previously picked from a storage bin 165 in the stock room 160 to be stocked in the primary display location 175 on the sales floor 180 as an indication of an increased likelihood that the product 190 is on feature at a feature display location 170 on the sales floor 180.

In some aspects, after retrieving the electronic data representing at least one inventory position estimation factor associated with the product 190 in step 330, the control unit 210 of the electronic inventory management device 120 is programmed to interpret electronic data indicating that present on-hand inventory of the product 190 being re-binned is above average as an indication of an increased likelihood that the product 190 is on feature at a feature display location 170 on the sales floor 180. In some aspects, after retrieving the electronic data representing at least one inventory position estimation factor associated with the product 190 in step 330, the control unit 210 of the electronic inventory management device 120 is programmed to interpret electronic data indicating that sales of the product 190 being re-binned during the predetermined interval of time are above average, as compared to the sales of the product 190 during an identical interval of time, as an indication of an increased likelihood that the product 190 is on feature at a feature display location 170 on the sales floor 180.

In some aspects, after retrieving the electronic data representing at least one inventory position estimation factor associated with the product 190 in step 330, the control unit 210 of the electronic inventory management device 120 is programmed to interpret electronic data indicating that a most recent delivery of the product 190 included a number of units of the product 190 that is greater than an average number of units of the product 190 historically delivered to the retail sales facility 110 as an indication of an increased likelihood that the product 190 is on feature at a feature display location 170 on the sales floor 180. In some aspects, after retrieving the electronic data representing at least one inventory position estimation factor associated with the product 190 in step 330, the control unit 210 of the electronic inventory management device 120 is programmed to interpret electronic data indicating that a manual replenishment order for the product 190 was made at the retail sales facility 110 as an indication of an increased likelihood that the product 190 is on feature at a feature display location 170 on the sales floor 180.

Generally if, during the estimating step 340 of the exemplary method 300, none of the inventory position estimation factors analyzed by the control unit 210 of the electronic inventory management device 120 are true, the control unit 210 of the electronic inventory management device 120 is programmed to interpret such analysis as an indication of a modular issue with respect to product 190, i.e., an issue with the stocking of the primary display location 175 of the product 190 on the sales floor 180. Such an indication of a modular issue may represent one or more errors associated with the stocking of the product 190 on the primary display location 175 on the sales floor 180. Such errors may occur, for example, due to a worker at the retail sales facility 110 either improperly indicating a stocking location of the product 190, or failing to scan the product 190 when stocking the product 190 onto the primary display location 175 on the sales floor 180.

Conversely, if, during the estimating step 340 of the exemplary method 300, at least one of the inventory position estimation factors analyzed by the control unit 210 of the electronic inventory management device 120 is true, the control unit 210 of the electronic inventory management device 120 is programmed to interpret such analysis as an indication of the presence of a feature display location 170 on the sales floor 180 of the retail sales facility 110. Such indication of the presence of a feature display location 170 on the sales floor 180 of the retail sales facility 110 may indicate that the unit of the product 190 being restocked by the worker on the sales floor 180 was not purchased by a consumer from the primary display location 175 (e.g., modular shelf) on the sales floor 180, but was purchased from the feature display location 170, and should be restocked at the feature display location 170 on the sales floor 180 instead of being binned in the storage bin 165.

In the exemplary method 300 depicted in FIG. 3, based on an analysis of at least such electronic information including the demand for the product 190 on the sales floor 180 of the retail sales facility 110 and one or more inventory position estimation factors described above, which may be retrieved by the control unit 210 of the electronic inventory management device 120 from the electronic inventory management database 140, the control unit 210 is programmed to output, when the at least one inventory position estimation factor supports a likelihood that the at least one product 190 is stocked in the feature display location 170, electronic data indicating possible space availability for the product 190 on the feature display location 170 on the sales floor 180 (350).

In some embodiments, when one or more inventory position estimation factors support the likelihood that the product 190 is stocked in a feature display location 170 on the sales floor 180 of the retail sales facility 110, the outputting step 350 of FIG. 3 may further include transmitting, from the electronic inventory management device 120, the electronic data indicating the possible space availability for the product 190 in the feature display location 170 to the electronic scanning device 130 of the worker at the retail sales facility 110. In one aspect, such a transmission from the electronic inventory management device 120 to the electronic scanning device 130 of the worker may include a visible alert (e.g., via an on-screen message) and/or an audible alert (e.g., beep or voice command) to inform the worker that additional space for the product 190 on the sales floor 180 may be available at a feature display location 170. Such an audible or visual alert on the electronic scanning device 130 of the worker regarding possible available space for the product 190 on the sales floor 180 at a feature display location 170 would indicate to the associate that the product 190 is to be brought to the feature display location 170 on the sales floor 180 instead of being re-binned in the storage bin 165 in the stock room 160. In some aspects, such an alert may further include a visual or audible alarm indicating that the primary display location 175 of the product 190 on the sales floor 180 of the retail sales facility 110 is erroneously labeled as having available space for the product 190.

In some embodiments, when the demand for the product 190 during the predetermined interval of time describe above is determined to be zero, or when none of the inventory position estimation factors support the likelihood that the product 190 is stocked in a feature display location 170 on the sales floor 180 of the retail sales facility 110, the outputting step 350 of FIG. 3 may further include transmitting, from the electronic inventory management device 120, to the electronic scanning device 130, an indication to the worker to place the product 190 into the storage bin 165 in the stock room 160 of the retail sales facility 110 (i.e., to proceed with re-binning the product 190). As described above, such a transmission from the electronic inventory management device 120 to the electronic scanning device 130 may include a visible alert (e.g., via an on-screen message) and/or an audible alert (e.g., beep or voice command).

In some embodiments, when the worker, in response to receiving an alert of possible available space for the product 190 at a feature display location 170 on the sales floor 180 of the retail sales facility 110 brings the product 190 to the sales floor 180 and attempts to stock the product 190 onto the feature display location 170 on the sales floor 180, the worker would scan the product 190 using the electronic scanning device 130 to indicate the placement of the product 190 on the feature display location 170. Responsive to such a scan, the method 300 may further include the step of receiving, at the electronic inventory management device 120, electronic data from the electronic scanning device 130 of the worker indicating that product 190 is being placed onto the feature display location 170 on the sales floor 180 of the retail sales facility 110. In order to update the electronic inventory management database 140 to reflect the correct location of the product 190 at the retail sales facility 110, the method 300 may further include the step of transmitting (from the electronic inventory management device 120 to the electronic inventory management database 140) the generated electronic data indicating that the product 190 is being placed onto the feature display location 170 on the sales floor 180.

The systems and methods described herein analyze the demand for a product and one or more inventory position estimation factors associated with a product at the retail sales facility to estimate whether additional space for the product may be available on the sales floor of the retail sales facility, for example, due to the product being displayed on the sales floor not only in a primary display location, but also at a feature display location. The methods and systems described herein significantly reduce the undesirable out of stock and potential loss of sale scenarios on the sales floor of a retail sales facility associated with inappropriate re-binning of replenishment products brought onto the sales floor, but brought back to the stock room for re-binning upon a determination by the worker that no space for the product is available at the primary display location due to the worker's lack of knowledge that the replenishment product is needed at the feature display location on the sales floor.

Those skilled in the art will recognize that a wide variety of other modifications, alterations, and combinations can also be made with respect to the above described embodiments without departing from the scope of the invention, and that such modifications, alterations, and combinations are to be viewed as being within the ambit of the inventive concept.

What is claimed is:

1. A system of estimating whether additional space for a product being binned is available on a sales floor of a retail sales facility, the system comprising:
   an electronic scanning device including:
      at least one of a display screen and a speaker; and
      a scanner configured to scan an identifying indicia on a surface of the product;
   an electronic inventory management database configured to store data representing a demand for the at least one product on the sales floor of the retail sales facility and data representing at least one inventory position estimation factor associated with the at least one product;
   an electronic inventory management device including a processor-based control unit, the control unit configured to:
      receive electronic data from the electronic scanning device indicating that at least one product is being placed into a storage bin in a stock room of the retail sales facility after a determination that no space for the at least one product is available in a primary display location of the at least one product on a sales floor of the retail sales facility;
      obtain from the electronic inventory management database the electronic data representing demand for the at least one product on the sales floor of the retail sales facility during a predetermined interval of time;
      analyze the obtained electronic data representing the demand to determine whether the demand for the at least one product during the predetermined interval of time is greater than zero;
      in response to a determination by the control unit that the demand for the at least one product during the predetermined interval of time is greater than zero, retrieve from the electronic inventory management database, the electronic data representing the at least one inventory position estimation factor associated with the at least one product;
      estimate whether the at least one inventory position estimation factor supports a likelihood that the at least one product is stocked in a feature display location on the sales floor of the retail sales facility; and
      output, when the at least one inventory position estimation factor supports a likelihood that the at least one product is stocked in the feature display location, electronic data indicating possible space availability for the at least one product on the feature display location on the sales floor; and
      transmit a notification including the electronic data indicating the possible space availability for the at least one product in the feature display location from the electronic inventory management device to the electronic scanning device;
   wherein, in response to receipt of the notification by the electronic scanning device, the electronic scanning device generates at least one of a visual and audible alert via the at least one of the display and the speaker of the electronic scanning device, the alert notifying the worker of the space availability for the at least one product in the feature display location and instructing the worker to bring the product to the feature display location instead of placing the product into the storage bin.

2. The system of claim 1, wherein the at least one inventory position estimation factor comprises one or more of: electronic data indicating that the at least one product being placed into the storage bin was delivered to the retail sales facility and not previously placed into a storage bin in the stock room since being delivered as part of an above-average size delivery to the retail sales facility; electronic data indicating that the at least one product being placed into the storage bin was previously picked from a storage bin in the stock room to be stocked in the primary display location on the sales floor; electronic data indicating that present on-hand inventory of the at least one product is above average on-hand inventory; electronic data indicating that sales of the at least one product during the predetermined interval of time are above average sales of the at least one product during an identical interval of time; electronic data indicating that a most recent delivery of the at least one product included a number of units of the at least one product that is greater than an average number of units delivered to the retail sales facility; and electronic data indicating that a manual replenishment order for the at least one product was made at the retail sales facility.

3. The system of claim 1, wherein the control unit is further configured to:
receive electronic data from the electronic scanning device of the worker indicating that at least one product is being placed in the feature display location on the sales floor of the retail sales facility; and
transmit the generated electronic data indicating that the at least one product is being placed in the feature display location on the sales floor to an electronic inventory management database.

4. The system of claim 1, wherein the control unit is further configured to, when the at least one inventory position estimation factor supports a likelihood that the at least one product is stocked in the feature display location on the sales floor of the retail sales facility, generate electronic data indicating that the at least one product is stocked in the feature display location on the sales floor, and transmit the generated electronic data indicating that the at least one product is stocked in the feature display location on the sales floor to an electronic inventory management database.

5. The system of claim 1, wherein the control unit is further configured to output, when the at least one inventory position estimation factor does not support a likelihood that the at least one product is stocked in the feature display location on the sales floor of the retail sales facility, an indication to the worker to place the at least one product into the storage bin in the stock room of the retail sales facility.

6. A method of estimating whether additional space for a product being binned is available on a sales floor of a retail sales facility, the method comprising:
providing an electronic scanning device including:
at least one of a display screen and a speaker; and
a scanner configured to scan an identifying indicia on at least one product;
providing an electronic inventory management device including a processor-based control unit;
receiving, by the electronic inventory management device and from the electronic scanning device and in response to a worker at the retail sales facility scanning the identifying indicia on the at least one product using the electronic scanning device when the worker is placing the at least one product into the storage bin, electronic data indicating that at least one product is being placed into a storage bin in a stock room of the retail sales facility after a determination that no space for the at least one product is available in a primary display location of the at least one product on a sales floor of the retail sales facility;
providing an electronic inventory management database configured to store data representing a demand for the at least one product on the sales floor of the retail sales facility and data representing at least one inventory position estimation factor associated with the at least one product;

in response to the receiving of the electronic data by the electronic inventory management device from the electronic scanning device:
obtaining, by the electronic inventory management device and from the electronic inventory management database, the electronic data representing the demand for the at least one product on the sales floor of the retail sales facility during a predetermined interval of time;
analyzing, by the processor-based control unit, the obtained electronic data representing the demand to determine whether the demand for the at least one product during the predetermined interval of time is greater than zero;
in response to a determination by the processor-based control unit that the demand for the at least one product during the predetermined interval of time is greater than zero, retrieving, by the electronic inventory management device and from the electronic inventory management database, the electronic data representing the at least one inventory position estimation factor associated with the at least one product;
estimating, by the processor-based control unit, whether the at least one inventory position estimation factor supports a likelihood that the at least one product is stocked in a feature display location on the sales floor of the retail sales facility;
outputting, when the at least one inventory position estimation factor supports a likelihood that the at least one product is stocked in the feature display location, electronic data indicating possible space availability for the at least one product on the feature display location on the sales floor; and
transmitting a notification including the electronic data indicating the possible space availability for the at least one product in the feature display location from the electronic inventory management device to the electronic scanning device;
in response to receipt of the notification by the electronic scanning device, generating, by the electronic scanning device, at least one of a visual and audible alert via the at least one of the display and the speaker of the electronic scanning device, the alert notifying the worker of the space availability for the at least one product in the feature display location and instructing the worker to bring the product to the feature display location instead of placing the product into the storage bin.

7. The method of claim 6, wherein the at least one inventory position estimation factor comprises: electronic data indicating that the at least one product being placed into the storage bin was delivered to the retail sales facility and not previously placed into a storage bin in the stock room since being delivered as part of an above-average size delivery to the retail sales facility; electronic data indicating that the at least one product being placed into the storage bin was previously picked from a storage bin in the stock room to be stocked in the primary display location on the sales floor; electronic data indicating that present on-hand inventory of the at least one product is above average on-hand inventory; electronic data indicating that sales of the at least one product during the predetermined interval of time are above average sales of the at least one product during an identical interval of time; electronic data indicating that a most recent delivery of the at least one product included a number of units of the at least one product that is greater than an average number of units delivered to the retail sales facility; and electronic data indicating that a manual replenishment order for the at least one product was made at the retail sales facility.

8. The method of claim 6, further comprising:
receiving, at the electronic inventory management device, electronic data from the electronic scanning device indicating that at least one product is being placed in the feature display location on the sales floor of the retail sales facility; and
transmitting the generated electronic data indicating that the at least one product is being placed in the feature display location on the sales floor from the electronic inventory management device to an electronic inventory management database.

9. The method of claim 6, wherein the outputting step further includes, when the at least one inventory position estimation factor supports a likelihood that the at least one product is stocked in the feature display location on the sales floor of the retail sales facility, generating electronic data indicating that the at least one product is stocked in the feature display location on the sales floor, and transmitting the generated electronic data indicating that the at least one product is stocked in the feature display location on the sales floor to an electronic inventory management database.

10. The method of claim 6, further comprising, outputting, when the at least one inventory position estimation factor does not support a likelihood that the at least one product is stocked in the feature display location on the sales floor of the retail sales facility, an indication to the worker to place the at least one product into the storage bin in the stock room of the retail sales facility.

* * * * *